United States Patent
Han et al.

(10) Patent No.: US 8,137,850 B2
(45) Date of Patent: Mar. 20, 2012

(54) GAS-LIQUID SEPARATOR AND FUEL CELL SYSTEM HAVING THE SAME

(75) Inventors: Ji-Seong Han, Yongin-si (KR); Sung-Jin Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1250 days.

(21) Appl. No.: 11/892,007

(22) Filed: Aug. 17, 2007

(65) Prior Publication Data

US 2008/0044690 A1 Feb. 21, 2008

(30) Foreign Application Priority Data

Aug. 17, 2006 (KR) .................. 10-2006-0077605

(51) Int. Cl.
*H01M 8/06* (2006.01)
(52) U.S. Cl. .................. 429/408; 429/412; 429/415
(58) Field of Classification Search .................. 429/408, 429/410–412, 415
See application file for complete search history.

(56) References Cited

U.S. PATENT DOCUMENTS

| | | | |
|---|---|---|---|
| 6,716,275 | B1 | 4/2004 | Reed et al. |
| 6,869,716 | B2 | 3/2005 | Neutzler |
| 7,238,224 | B2 | 7/2007 | Kent |
| 2003/0170522 | A1* | 9/2003 | Hirsch ........................... 429/34 |
| 2007/0180992 | A1* | 8/2007 | Kang et al. ........................... 96/4 |

FOREIGN PATENT DOCUMENTS

| | | |
|---|---|---|
| JP | 2004-206917 A | 7/2004 |
| JP | 2005-179106 A | 7/2005 |
| JP | 2006-209985 A | 8/2006 |
| KR | 10-2004-0074730 | 8/2004 |

OTHER PUBLICATIONS

*Notice of Allowance* from the Korean Intellectual Property Office issued in Applicant's corresponding Korean Patent Application No. 10-2006-0077605 dated Jul. 30, 2007.

* cited by examiner

*Primary Examiner* — Thanhha Pham
(74) *Attorney, Agent, or Firm* — Robert E. Bushnell, Esq.

(57) ABSTRACT

Disclosed is a gas-liquid separator capable of allowing carbon dioxide to be exhausted to the atmosphere so as to recover and recycle only unreacted fuel discharged from an electric generator, and a fuel cell system having the same. The fuel cell system includes an electric generator to generate electricity by electrochemical reaction between hydrogen and oxygen, a fuel feeder to supply hydrogen containing fuel to the electric generator, an oxidant feeder to supply oxygen to the electric generator, and a recovering unit to recover unreacted fuel generated during the electrochemical reaction in the electric generator and supply the unreacted fuel to the fuel feeder. The recovering unit comprises a frame structure, and a gas-liquid separation film partially surrounding the frame structure. The gas-liquid separator forms a flow space inside the frame structure. Accordingly, the unreacted fuel, which is not participated in the oxidation-reduction reaction between the hydrogen containing fuel and the oxidant, is recovered and recycled while excluding carbon dioxide, so that power generation efficiency of the fuel cell system is enhanced.

13 Claims, 4 Drawing Sheets

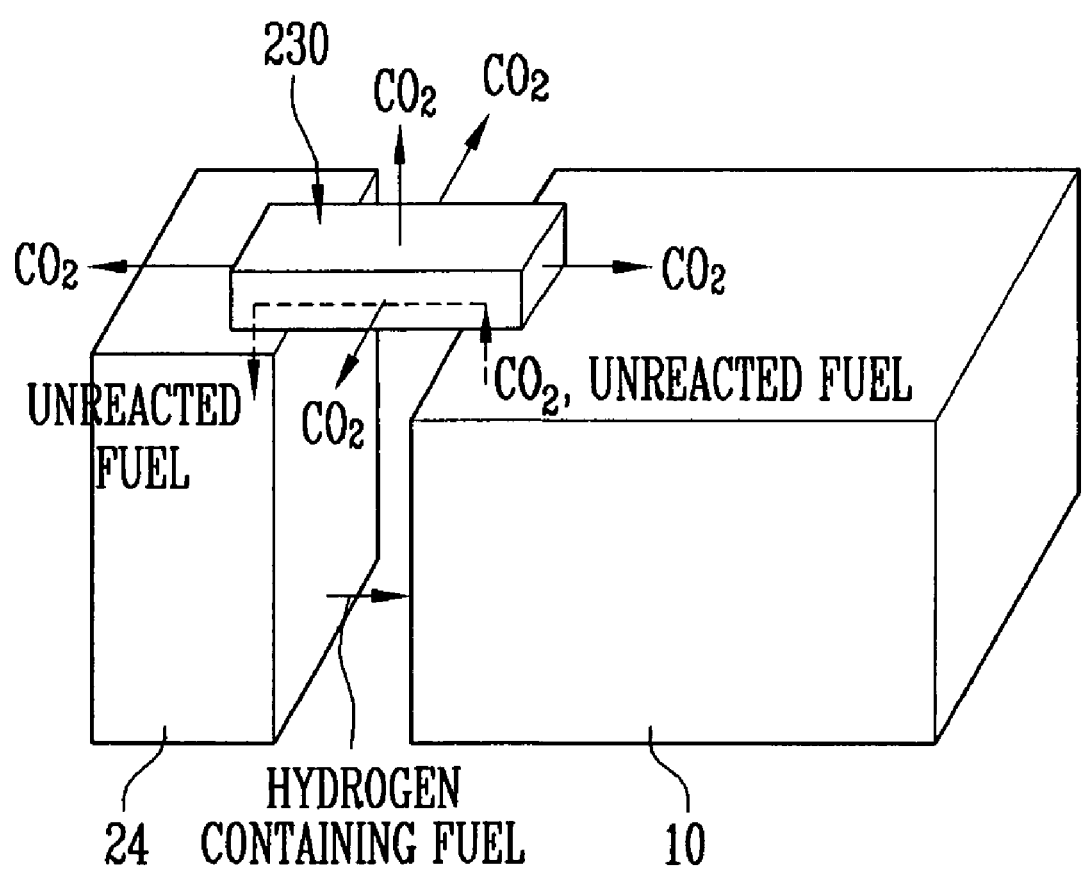

GAS-LIQUID SEPARATOR AND FUEL CELL SYSTEM HAVING THE SAME

CLAIM OF PRIORITY

This application makes reference to, incorporates the same herein, and claims all benefits accruing under 35 U.S.C. §119 from an application for GAS/LIQUID SEPARATOR AND FUEL CELL SYSTEM HAVING THE SAME earlier filed in the Korean Intellectual Property Office on the 17 of Aug. 2006 and there duly assigned Ser. No. 10-2006-0077605.

BACKGROUND OF THE INVENTION

1. Field of the Invention

The present invention relates to a gas-liquid separator and a fuel cell system having the same, in which only gas components outwardly exhaust from materials discharged from an electric generator of a fuel cell, and more particularly, to a gas-liquid separator capable of allowing carbon dioxide to be exhausted to the atmosphere so as to recover and recycle only unreacted fuel discharged from an electric generator, and a fuel cell system having the same.

2. Description of the Related Art

In general, a fuel cell system is a power generation system that directly transforms chemical energy into electric energy through electrochemical reaction between hydrogen of hydrogen containing fuel and oxygen of an oxidant. Such a fuel cell system comprises an electric generator to generate electricity, a fuel feeder to supply the hydrogen containing fuel to the electric generator, and an oxidant feeder to supply the oxidant to the electric generator. Further, the fuel cell system comprises an unreacted fuel recovering unit such that the unreacted fuel and steam discharged from the electric generator are recovered and reused.

The electric generator has a stack in which a plurality of unit cells to generate electricity is stacked. The unit cell comprises a membrane electrode assembly (MEA) that includes an anode electrode, a cathode electrode, and an electrolyte membrane interposed between the anode and cathode electrodes, and separators, e.g., bipolar plates, both surfaces of which face the anode and cathode electrodes, respectively, and are formed with channels through which fluid can flow.

The bipolar plates not only provide the anode and cathode electrodes with reactants such as the hydrogen containing fuel and oxygen, respectively, but also discharge products such as carbon dioxide and water from the anode and cathode electrodes to the outside, respectively.

The hydrogen containing fuel, which is not reacted in the anode electrode, produces unreacted hydrogen containing fuel. The unreacted hydrogen containing fuel exhausted from the anode electrode is recovered through the unreacted fuel recovering unit and supplied into the electric generator.

While unreacted hydrogen containing fuel is recovered through the unreacted fuel recovering unit, carbon dioxide produced in the anode electrode may be recovered as it is mixed with the unreacted hydrogen containing fuel. At this time, if recovered carbon dioxide is supplied to the anode electrode of the electric generator, power generation efficiency of the fuel cell is reduced.

SUMMARY OF THE INVENTION

Accordingly, it is an object of the present invention to provide a gas-liquid separator and a fuel cell system comprising the same, which can effectively remove carbon dioxide from unreacted hydrogen containing fuel discharged from an anode electrode of an electric generator that generates electricity through electrochemical reaction between hydrogen and oxygen.

The foregoing other objects of the present invention are achieved by providing a gas-liquid separator comprising a three dimensional frame structure and a gas-liquid separation film enclosing at least a part of the frame structure, wherein the gas-liquid separation film causes the frame structure to have a flow space therein.

According to an aspect of the invention, the frame structure comprises a fluid inlet and a fluid outlet at opposite sides thereof.

According to an aspect of the invention, the frame structure comprises a first frame body and a second frame body, which have a predetermined shape, and a plurality of frame supporters interposed between the frame bodies and supporting the frame bodies. The frame structure can comprise a base having a plate shape, a frame body having a predetermined shape and positioned over the base, and a plurality of frame supporters interposed between the base and the frame body and supporting the frame body over the base.

Another aspects of the present invention can be achieved by providing a gas-liquid separator comprising a three dimensional frame structure that comprises a base having a plate shape, a frame body having a predetermined shape and positioned over the base, and a plurality of frame supporters interposed between the base and the frame body and supporting the frame body over the base, and a gas-liquid separation film surrounding at least a part of the frame structure, wherein the gas-liquid separation film causes the frame structure to have a flow space therein, and the base is formed with a fluid introducing hole and a fluid discharging hole.

Still another aspects of the present invention can be achieved by providing a fuel cell system comprising an electric generator to generate electricity by electrochemical reaction between hydrogen and oxygen; a fuel feeder to supply hydrogen containing fuel to the electric generator, an oxidant feeder to supply oxygen to the electric generator, and a recovering unit to recover unreacted fuel generated during the electrochemical reaction in the electric generator and supply the unreacted fuel to the fuel feeder. The recovering unit comprises a three dimensional frame structure, and a gas-liquid separation film surrounding at least a part of the frame structure, wherein the gas-liquid separator causes the frame structure to have a flow space therein.

According to an aspect of the invention, the fuel feeder comprises a fuel storage to store the hydrogen containing fuel, and a mixer connected to and communicating with the fuel storage, and one end of the gas-liquid separator is connected to and communicating with the mixer.

Yet another aspects of the present invention can be achieved by providing a fuel cell system comprising an electric generator to generate electricity by electrochemical reaction between hydrogen and oxygen, a fuel feeder to supply hydrogen containing fuel to the electric generator, an oxidant feeder to supply oxygen to the electric generator, and a recovering unit to recover unreacted fuel generated during the electrochemical reaction in the electric generator and supply the unreacted fuel to the fuel feeder. The recovering unit comprises a three dimensional frame structure that comprises a base having a plate shape, a frame body having a predetermined shape and positioned over the base, and a plurality of frame supporters interposed between the base and the frame body and supporting the base and the frame body over the base; and a gas-liquid separation film surrounding at least a part of the frame structure, and wherein the base is formed with a fluid introducing hole and a fluid discharging hole.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 7 is a perspective view illustrating the gas-liquid separator of FIG. 6, which is placed between an electric generator and a mixer.

DETAILED DESCRIPTION OF THE INVENTION

Hereinafter, embodiments of the present invention will be described with reference to accompanying drawings, wherein like numerals refer to like elements throughout.

Figure 1:
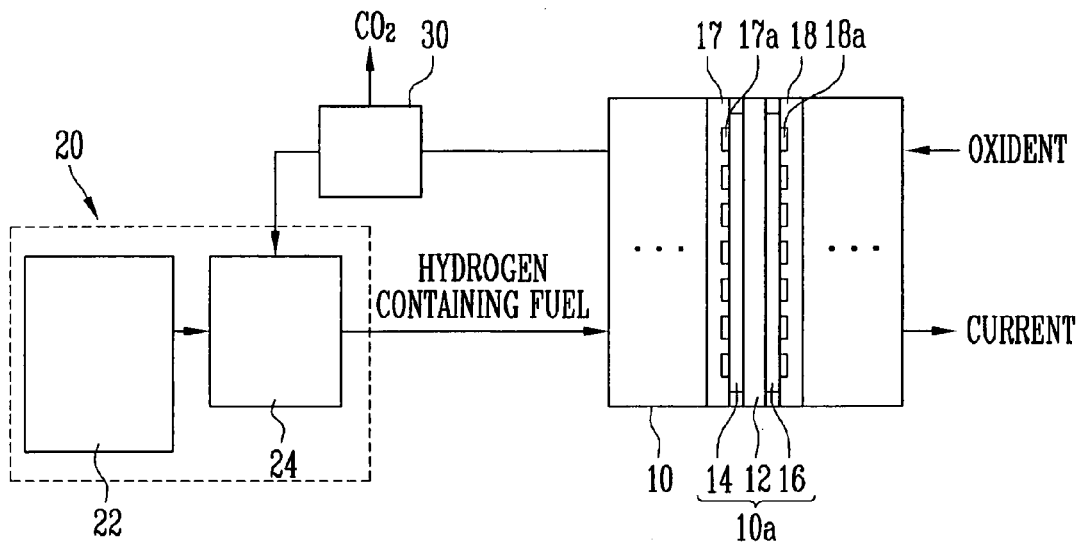
FIG. 1 is a schematic view of a fuel cell system with a gas-liquid separator proposed in the present invention.

FIG. 1 is a schematic view of a fuel cell system with a gas-liquid separator proposed in the present invention. Referring to FIG. 1, a fuel cell system of the present invention comprises electric generator 10 to generate electricity through electrochemical reaction between hydrogen and oxygen, fuel feeder 20 to supply hydrogen containing fuel to electric generator 10, and oxidant feeder (not shown) to supply an oxidant, e.g., oxygen in air to the electric generator 10.

Fuel feeder 20 includes fuel storage 22 for storing the hydrogen containing fuel, and mixer 24 for mixing the hydrogen containing fuel from the fuel storage 22 with water or the like to have a predetermined concentration, and for supplying it to the electric generator 10. Further, the mixer 24 receives water and unreacted fuel from the electric generator 10 through recovering unit 30, which will be described later.

The electric generator 10 is supplied with a unit cell that comprises membrane electrode assembly 10a including anode electrode 14, cathode electrode 16, and electrolyte membrane 12 interposed between the anode and cathode electrodes 14 and 16 and having preferential ion permeability. The unit cell includes separation plates 17 and 18 for supplying the hydrogen containing fuel and the oxidant to the anode electrode 14 and the cathode electrode 16, respectively. Separation plates 17 and 18 comprise fuel supplying channel 17a and oxygen supplying channel 18a through which the hydrogen containing fuel and the oxidant (e.g., oxygen) are supplied to the anode electrode 14 and the cathode electrode 16, respectively. At this time, electric generator 10 has a stack structure in which a plurality of unit cells is stacked.

In membrane electrode assembly 10a, electrolyte membrane 12 is a kind of conductive polymer electrolyte membrane that has not only an ion exchange function to transmit hydrogen ion generated in a catalyst layer (not shown) of the anode electrode 14 to the catalyst layer of the cathode electrode 16 but also a function to prevent hydrogen containing fuel from permeating. The electrolyte membrane 12 has a thickness of about 50~200 μm. For example, the electrolyte membrane 12 includes a perfluorosulfonate resin membrane of Nafion, a membrane formed by coating a porous polytetrafluoroethylene thin film support with a resin solution perfluorinated sulfonic acid or the like, a membrane formed by coating a porous non-conductive polymer support with a positive ion exchange resin and inorganic silicate, etc.

Cathode electrode 16 comprises a first porous support layer such as carbon paper, a first diffusion layer, and a first catalyst layer, wherein the first diffusion layer and the first catalyst layer are made of a catalyst material and sequentially stacked on the first porous support layer. The first porous support layer functions not only for an oxygen introducing path, into which oxygen supplied through the oxygen supplying channel 18a formed on one side of the first separation plate is introduced, but also for an water discharging path, from which water ($H_2O$) produced as a byproduct of electrochemical reaction performed in the first catalyst layer is discharged. In the first catalyst layer, oxygen provided via the first porous support layer and the first diffusion layer is reduced by the following reaction Formula 1.

Formula 1 (Cathode reaction):

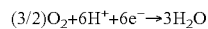

$$(3/2)O_2 + 6H^+ + 6e^- \rightarrow 3H_2O$$

The first diffusion layer is interposed between the first porous support layer and the first catalyst layer, and discharges water generated by the foregoing reduction reaction toward the first porous support layer, while allowing oxygen supplied through the oxygen supplying channel 18a to be uniformly diffused on the first catalyst layer.

Likewise, anode electrode 14 comprises a second porous support layer such as carbon paper, a second diffusion layer, and a second catalyst layer, wherein the second diffusion layer and the second catalyst layer are made of a catalyst material and sequentially stacked on the second porous support layer. The second porous support layer functions not only for a fuel introducing path, into which the hydrogen containing fuel supplied through the fuel supplying channel 17a formed on one side of the second separation plate 17 is introduced, but also for a carbon dioxide ($CO_2$) discharging path, from which carbon dioxide ($CO_2$) produced as a byproduct of electrochemical reaction performed in the second catalyst layer is discharged. In the second catalyst layer, the hydrogen containing fuel (e.g., methanol) having predetermined concentration and provided via the second porous support layer and the second diffusion layer is oxidized by the following reaction Formula 2.

Formula 2 (Anode reaction):

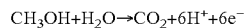

$$CH_3OH + H_2O \rightarrow CO_2 + 6H^+ + 6e^-$$

The second diffusion layer is interposed between the second porous support layer and the second catalyst layer, and discharges carbon dioxide generated by the foregoing oxidation reaction toward the second porous support layer, while allowing the hydrogen containing fuel supplied through the fuel supplying channel 17a to be uniformly diffused on the second catalyst layer. At this time, a part of the hydrogen containing fuel is not oxidized in the anode electrode and discharged as an unreacted fuel.

Accordingly, when the hydrogen containing fuel having predetermined concentration is supplied from mixer 24 to anode electrode 14 of electric generator 10 and the oxidant (i.e., oxygen) is supplied from an oxidant feeder to cathode electrode 16 of electric generator 10, reaction between methanol and water produces carbon dioxide, six hydrogen ions, and six electrons (oxidation reaction). Then, the hydrogen ions are transferred to cathode electrode 16 via electrolyte membrane 12, e.g., a hydrogen ion exchange membrane. In cathode electrode 16, the hydrogen ions, the electrons and oxygen are reacted to thereby produce water (reduction reaction). Totally, methanol and oxygen are reacted while producing water and carbon dioxide, thereby generating electricity.

According to an embodiment of the present invention, the byproducts, e.g., water and the unreacted fuel produced in electric generator 10, are recovered through recovering unit 30, and then introduced into mixer 24 of fuel feeder 20 so as to be recycled. While water and the unreacted fuel are recovered, carbon dioxide produced in anode electrode 14 of electric generator 10 can be recovered along a recovering path for water and the unreacted fuel.

As described above, some of the hydrogen containing fuel supplied to anode electrode 14 is not reacted in the oxidation reaction of the anode electrode, and discharged as an unreacted fuel. Further, the electrochemical reaction in cathode electrode 16 of the electric generator 10 can result in producing carbon dioxide as its byproduct. Carbon dioxide is discharged from electric generator 10 as being mixed with the unreacted hydrogen containing fuel, i.e., the unreacted fuel. Accordingly, in order to recover only the unreacted fuel from the discharged mixture, recovering unit 30 of the present invention is designed to directly connect electric generator 10 and mixer 24 of fuel feeder 20 in a manner that they are connected to each other.

Figure 2:
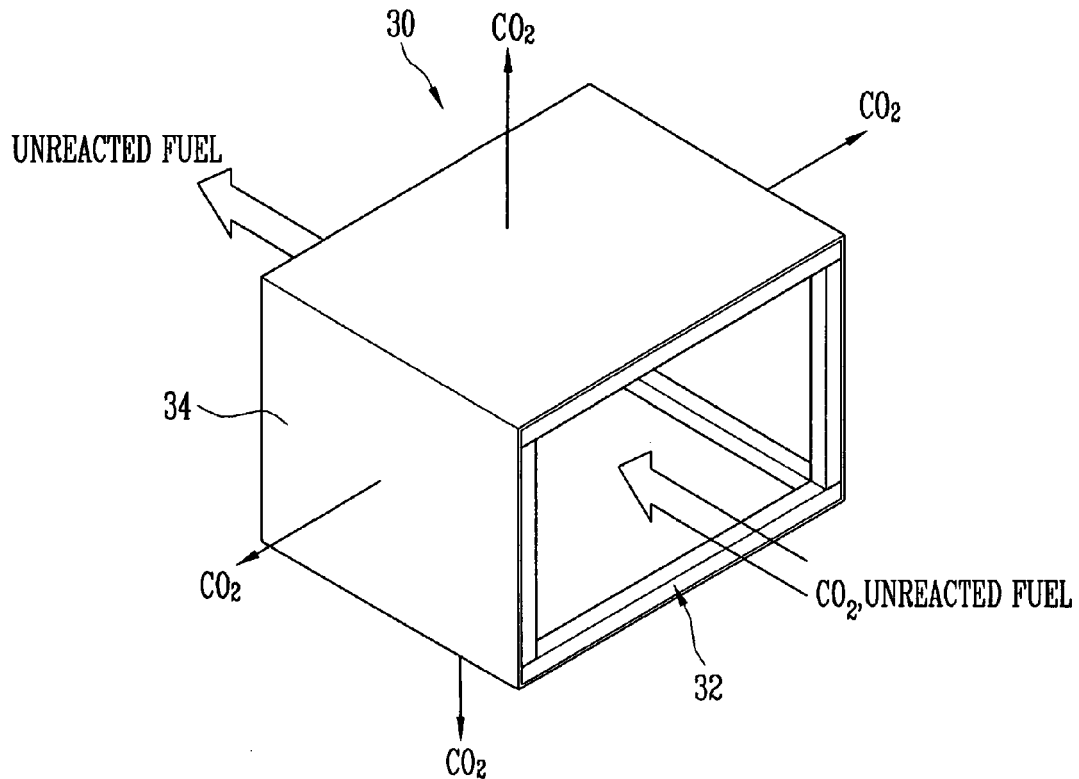
FIG. 2 is a perspective view of the gas-liquid separator of the present invention.

FIG. 2 is a perspective view of the gas-liquid separator of the present invention. Referring to FIG. 2, recovering unit 30 comprises three dimensional frame structure 32, gas-liquid separation film 34 partially surrounding an outer surface of frame structure 32, a fluid inlet, and a fluid outlet (not shown).

Gas-liquid separation film 34 preferably has a gas permeable thin film structure, and more preferably includes a hydrophobic material. The gas permeable film is configured to allow gas to pass through a surface of the gas permeable film, and is configured not to allow liquid to pass through a surface of the gas permeable film. Thus, the unreacted fuel flowing in a flow space of recovering unit 30 is repelled from gas-liquid separation film 34 that contains a hydrophobic material. As a result, carbon dioxide mixed in the unreacted fuel can be readily discharged outside through gas-liquid separation film 34.

Accordingly, both of carbon dioxide and an unreacted fuel discharged from electric generator 10 flow into recovering unit 30 through a fluid inlet, but only the unreacted fuel is discharged through a fluid outlet of recovering unit 30. At this time, carbon dioxide is discharged out of recovering unit 30 through gas-liquid separation film 34, while moving along the flow space formed inside recovering unit 30.

Figure 3:
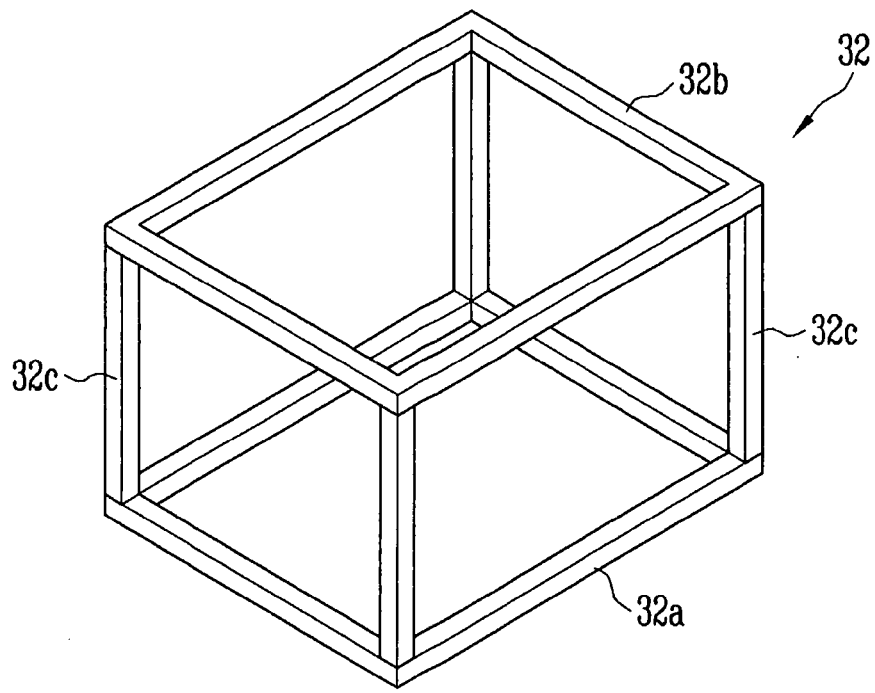
FIG. 3 is a perspective view of a frame structure for the gas-liquid separator constructed as an embodiment of the present invention.

FIG. 3 is a perspective view of a frame structure of the gas-liquid separator of the present invention. Referring to FIG. 3, frame structure 32 comprises first frame body 32a and second frame body 32b, both of which have a predetermined shape, and a plurality of frame supporters 32c, each of which is interposed between first and second frame bodies 32a and 32b. Frame supporters 32c connect first frame body 32a to second frame body 32b. As shown in FIG. 3, first and second frame bodies 32a and 32b and frame supporters 32c are formed of beams, and therefore frame structure 32 has a skeleton structure like a truss with open side surfaces. Frame structure 32 can have a shape like a hexahedron. However, the shape of the frame structure 32 is not limited to the hexahedron. The frame structure also can be formed into various structures having beams and plates.

Figure 4:
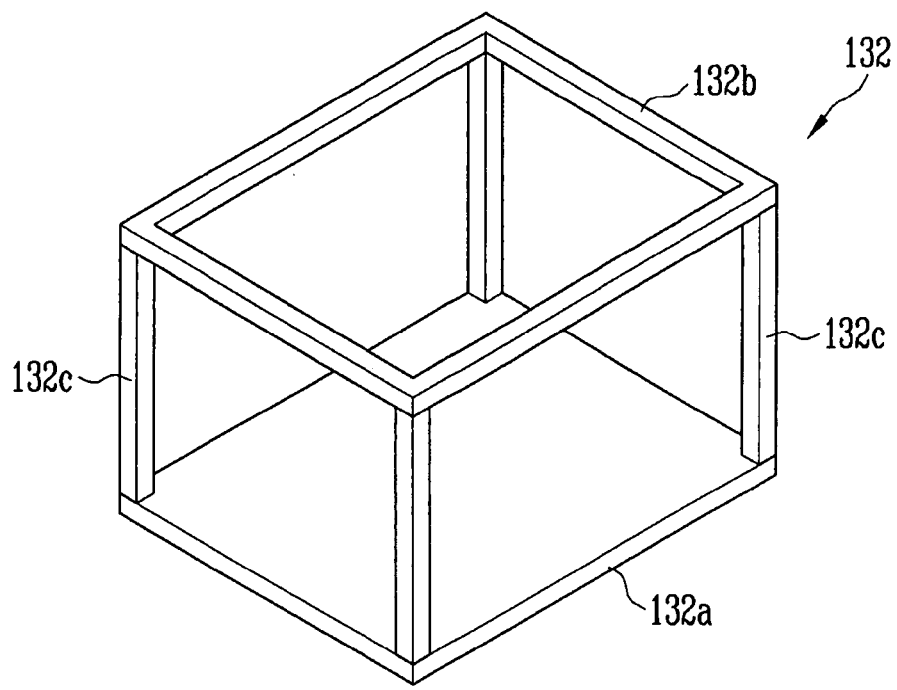
FIG. 4 is a perspective view of a frame structure for the gas-liquid separator constructed as an embodiment of the present invention.

FIG. 4 is a perspective view of a frame structure for the gas-liquid separator according to an embodiment of the present invention. Referring to FIG. 4, frame structure 132 comprises base 132a having a plate shape, second frame body 132b having a predetermined shape and positioned over the base, and a plurality of frame supporters 132c interposed between base 132a and frame body 132b and supporting them. The frame structure 132 has a shaped like a hexahedron, of which sides except the base 132a are open.

Figure 5:
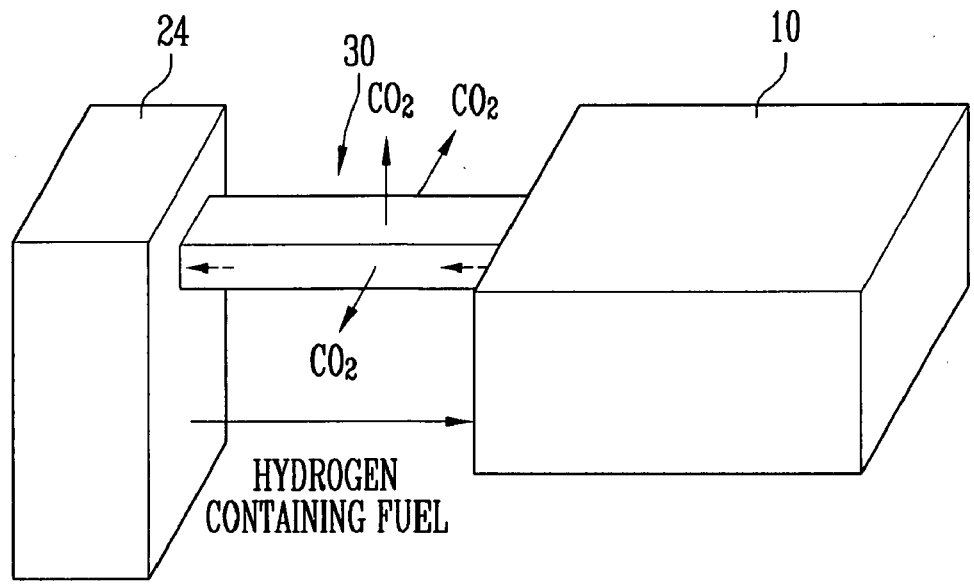
FIG. 5 is a perspective view illustrating the gas-liquid separator provided between an electric generator and a mixer according to the present invention.

FIG. 5 is a perspective view illustrating the gas-liquid separator provided between an electric generator and a mixer according to the present invention. Referring to FIG. 5, recovering unit 30 is interposed between electric generator 10 and mixer 24, and connects electric generator 10 to mixer 24. At this time, a fluid inlet of recovering unit 30 is directly connected to an outlet (not shown) provided in the electric generator 10 that discharges carbon dioxide and unreacted fuel. Further, a fluid outlet of recovering unit 30 is directly connected to an inlet (not shown) provided in mixer 24 that guides the unreacted fuel into mixer 24. Therefore, even though carbon dioxide and the unreacted fuel discharged from electric generator 10 are introduced through the fluid inlet of recovering unit 30, carbon dioxide is discharged outside recovering unit 30 through gas-liquid separation film 34, and the unreacted fuel is introduced into mixer 24 through the fluid outlet of recovering unit 30.

Thus, the hydrogen containing fuel supplied from fuel storage 22 having high concentration is diluted with the unreacted fuel that is recovered through recovering unit 30 and supplied to mixer 24 of fuel feeder 20, thereby having a predetermined concentration. Then, the diluted hydrogen containing fuel is supplied to anode electrode 14 of electric generator 10, so that electricity is generated by the foregoing electrochemical reaction.

Figure 6:
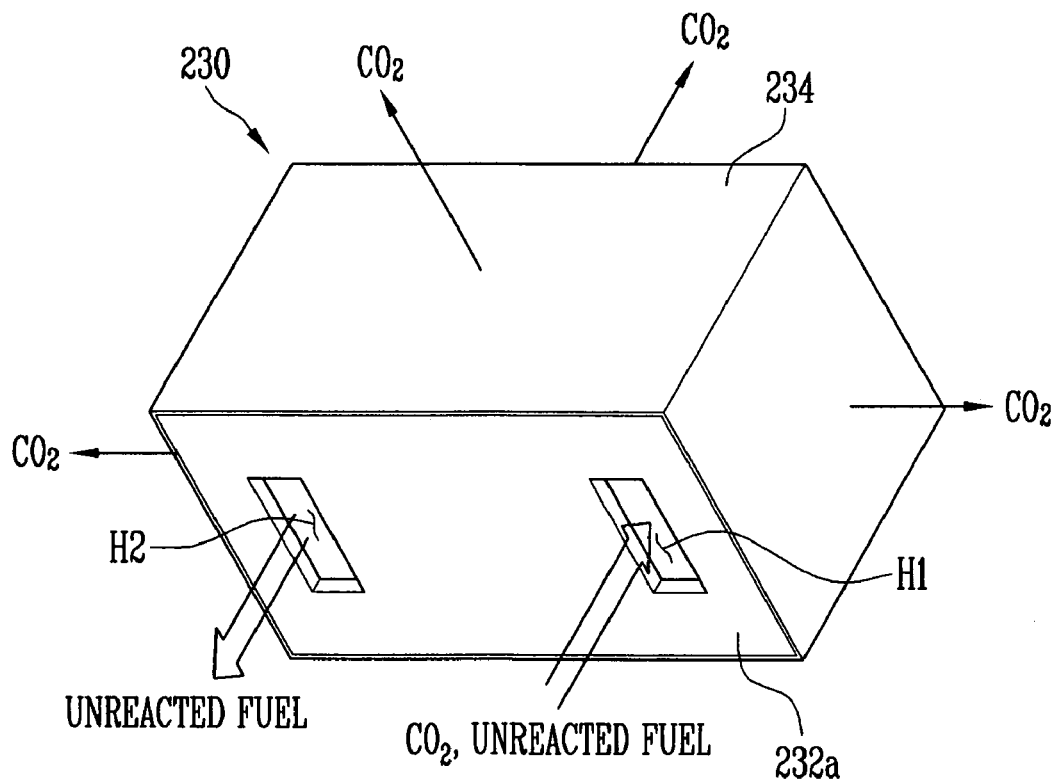
FIG. 6 is a bottom view of a gas-liquid separator constructed as another embodiment of the present invention.

FIG. 6 is a bottom view of a gas-liquid separator according to another embodiment of the present invention. Referring to FIG. 6, recovering unit 230 constructed as another embodiment comprises a frame structure, which has a similar structure to the frame structure 132 shown in FIG. 4 except that base 232a is formed with fluid introducing hole H1 and fluid discharging hole H2. Gas-liquid separation film 234 surrounds outer surfaces of the frame structure. In recovering unit 230, carbon dioxide and unreacted fuel discharged from electric generator 10 are introduced through the fluid introducing hole H1, and then carbon dioxide is discharged to the outside through gas-liquid separation film 234, and the unreacted fuel is discharged to mixer 24 through the fluid discharging hole H2.

FIG. 7 is a perspective view illustrating the gas-liquid separator of FIG. 6, which is placed between the electric generator and the mixer. Referring to FIG. 7, recovering unit 230 is provided between electric generator 10 and mixer 24 while allowing fluid to flow therebetween. In this case, the fluid introducing hole H1 of recovering unit 230 is directly connected to an outlet (not shown) placed on a top of the electric generator 10 for discharging carbon dioxide and the unreacted fuel, and the fluid discharging hole H2 is directly connected to an inlet (not shown) placed on a top of the mixer for introducing the unreacted fuel. Accordingly, carbon dioxide and the unreacted fuel discharged from electric generator 10 are introduced through the fluid introducing hole H1 of the recovering unit 230. Carbon dioxide is discharged outside recovering unit 230 through gas-liquid separation film 234, and the unreacted fuel is introduced into mixer 24 through fluid discharging hole H2.

According to the present invention, the unreacted fuel not participated in the oxidation-reduction reaction between the hydrogen containing fuel and the oxidant is recovered and recycled while excluding carbon dioxide, so that power generation efficiency of the fuel cell system can be enhanced.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A gas-liquid separator adapted into a fuel cell system, comprising:
   a frame structure having at least one open side, the frame structure comprising:
      a first frame body;
      a second frame body; and
      a plurality of frame supporters interposed between the first frame body and the second frame body, each of the first frame body and the second frame body being formed with a plurality of beams; and
   a gas-liquid separation film enclosing the at least one open side of the frame structure in a manner that the gas-liquid separation film and the frame structure form an enclosed flow space inside the frame structure, the gas-liquid separation film including a gas permeable film.

2. The gas-liquid separator according to claim 1, wherein the gas-liquid separator further comprises a fluid inlet for receiving an unreacted fuel and gas, and a fluid outlet for discharging the unreacted fuel.

3. The gas-liquid separator according to claim 1, wherein the first frame body includes a plate.

4. The gas-liquid separator according to claim 1, wherein the frame structure has a shape of hexahedron.

5. A gas-liquid separator adapted into a fuel cell system, comprising:
   a frame structure that comprises:
      a base having a plate shape, the base having a fluid introducing hole and a fluid discharging hole;
      a frame body facing the base, the frame body formed of a plurality of beams; and
      a plurality of frame supporters interposed between the base and the frame body; and
   a gas-liquid separation film enclosing the frame body and the frame supporters in a manner that the gas-liquid separation film and the base form an enclosed flow space inside the frame structure, the gas-liquid separation film including a gas permeable film.

6. A fuel cell system comprising:
   an electric generator to generate electricity through electrochemical reaction between hydrogen and oxygen;
   an oxidant feeder to supply oxygen to the electric generator;
   a recovering unit to recover unreacted fuel generated during the electrochemical reaction in the electric generator and to supply the unreacted fuel to a fuel feeder, the recovering unit comprising:
      a frame structure having at least one open side; and
      a gas-liquid separation film enclosing the at least one open side of the frame structure in a manner that the gas-liquid separation film and the frame structure form an enclosed flow space inside the frame structure, the gas-liquid separation film including a gas permeable film; and
   the fuel feeder to supply hydrogen containing fuel to the electric generator, the fuel feeder comprising:
      a fuel storage to store the hydrogen containing fuel; and
      a mixer connected to each of the fuel storage and the recovering unit, the mixer mixing the unreacted fuel supplied from the recovering unit with fuel supplied from the fuel storage.

7. The fuel cell system according to claim 6, wherein the recovering unit further comprises a fluid inlet for receiving an unreacted fuel and gas from the electric generator, and a fluid outlet for discharging the unreacted fuel to the fuel feeder.

8. The fuel cell system according to claim 6, wherein the frame structure comprises:
   a first frame body;
   a second frame body; and
   a plurality of frame supporters interposed between the first frame body and a second frame body.

9. The fuel cell system according to claim 8, wherein the first frame body includes a plate.

10. The fuel cell system according to claim 8, wherein each of the first frame body and the second frame body is formed with a plurality of beams.

11. The fuel cell system according to claim 8, wherein the frame structure has a shape of hexahedron.

12. A fuel cell system comprising:
   an electric generator to generate electricity by electrochemical reaction between hydrogen and oxygen;
   a fuel feeder to supply hydrogen containing fuel to the electric generator;
   an oxidant feeder to supply oxygen to the electric generator; and
   a recovering unit to recover unreacted fuel generated during the electrochemical reaction in the electric generator and to supply the unreacted fuel to the fuel feeder, the recovering unit comprising:
      a frame structure that comprises:
         a base having a plate shape, the base having a fluid introducing hole and a fluid discharging hole;
         a frame body facing the base, the frame body formed of a plurality of beams; and
         a plurality of frame supporters interposed between the base and the frame body; and
      a gas-liquid separation film enclosing the frame body and the frame supporters in a manner that the gas-liquid separation film and the base form an enclosed flow space inside the frame structure, the gas-liquid separation film including a gas permeable film.

13. The fuel cell system according to claim 12, wherein the fuel feeder comprises:
   a fuel storage to store the hydrogen containing fuel; and
   a mixer connected to each of the fuel storage and the recovering unit, the mixer mixing the unreacted fuel supplied from the recovering unit with fuel supplied from the fuel storage.

* * * * *